Nov. 7, 1961

G. R. P. MARIÉ

3,008,100

CIRCULAR TO RECTANGULAR GUIDE COUPLING SYSTEM

Filed Nov. 25, 1960

INVENTOR
GEORGES R. P. MARIÉ

Nov. 7, 1961

G. R. P. MARIÉ

3,008,100

CIRCULAR TO RECTANGULAR GUIDE COUPLING SYSTEM

Filed Nov. 25, 1960

INVENTOR
GEORGES R. P. MARIÉ

Nov. 7, 1961

G. R. P. MARIÉ

3,008,100

CIRCULAR TO RECTANGULAR GUIDE COUPLING SYSTEM

Filed Nov. 25, 1960

INVENTOR
GEORGES R. P. MARIÉ

Nov. 7, 1961 G. R. P. MARIÉ 3,008,100
CIRCULAR TO RECTANGULAR GUIDE COUPLING SYSTEM
Filed Nov. 25, 1960 4 Sheets-Sheet 4

INVENTOR
GEORGES R. P. MARIÉ

3,008,100
CIRCULAR TO RECTANGULAR GUIDE COUPLING SYSTEM
Georges Robert Pierre Marié, 21 Edge Wood Road, Rumson, N.J.
Filed Nov. 25, 1960, Ser. No. 71,552
Claims priority, application France Dec. 4, 1959
6 Claims. (Cl. 333—21)

The present invention relates to a coupling device for transferring wide band ultra-high frequency electromagnetic wave energy propagating according to a $TE_{on}$ mode in a circular cross-section wave guide to one or a plurality of rectangular cross-section wave guides without altering the revolution symmetry of the $TE_{on}$ mode around the axis of the circular guide.

More specifically, the invention relates to a branching filter or multichannel filter allowing to extract from (or conversely to introduce into) a circular guide transmitting an ultra-high frequency wide band electromagnetic wave, including several frequency-staggered communication channels, the energy relating to one of said channels, and to direct it toward (or to extract it from) one of said rectangular guides.

The device of the invention is particularly suitable for the separating of channels using such high carrier frequencies that the transmission of the corresponding waves requires the use of propagation modes in which the electric field of the wave in the guide is at no point of its wall perpendicular thereto, i.e. of a $TE_{on}$ mode in a circular guide, the attenuation of which is known to decrease with increasing frequency. The major interest of the device resides in the possibility of transmitting waves having free-space wavelengths of the order of 5 millimeters, but nevertheless it is also of some interest for waves of greater wavelength, provided the diameter of the circular guide be at least equal to several times their free-space wavelength.

It is known that by cutting according to a circular cross-section a cylindrical resonant cavity, the resonant frequency of which is the middle frequency of a given communication channel, and by slightly drawing apart the edges of the cut in a direction parallel to the axis of said cavity, so as to form a peripheral circular slot, electromagnetic energy is radially radiated in the form of a flat beam all around said circular slot, if the cavity is assumed to be energized according to a $TE_{on}$ mode.

The energy pertaining to the considered channel and radially radiated as a beam with a 360 degree aperture can theoretically be focussed toward the input opening of a rectangular wave guide (at the output of which the energy of said channel may thereafter be collected) by means of a reflector having the shape of a cylinder with an elliptic cross-section so located that the axis of the resonant cavity coincides with one of the focal lines of said reflector (the peripheral circular slot thus being centered on this focal line) provided that the opening of that rectangular wave guide be located in the vicinity of the other focal line.

From a constructional viewpoint, this arrangement is hardly a possible one. It requires the use of a cylindrical reflector with an elliptic cross-section and a complete 360-degree peripheral development, which is difficult to build. Furthermore, the energy radially converging toward the input opening of the rectangular wave guide is not totally collected at this opening, as the directional diagram of the beam radiated by the opening of a rectangular wave guide does not match that of the reflector, which causes the energy to converge from every direction toward its focal line.

The object of the present invention is a device capable of collecting the whole energy contained in a flat beam having a 360-degree angular aperture and radiated by a peripheral circular slot provided in a cylindrical resonant cavity coupled with a cylindrical wave guide in which a wave propagates according to a circular electric mode and to focus it toward the opening of a rectangular wave guide without disturbing the wave which propagates in the circular guide, said device using only sectoral parts of a cylindro-elliptical reflector. This is made possible thanks to the use of suitably built dielectric lenses located between said circular slot and reflector. The dimensioning of said lenses is an important feature of the invention.

The device of the invention comprises a main circular cylindrical wave guide, a ring-shaped cylindrical cavity coupled to and substantially coaxial with said circular guide, a peripheral circular slot in the outer cylindrical wall of said cavity, a reflecting box enclosing said cavity and limited on one hand by two plane conducting end walls substantially perpendicular to the axis of said circular guide and by a conducting sidewall substantially parallel to said axis, a plurality of cylindrical dielectric lenses set up inside said box with their cylindrical surfaces substantially parallel to said axis, a plurality of cylindrical reflectors set up inside said box with their surfaces substantially parallel to said axis, and a plurality of auxiliary rectangular wave guide lengths each having a first opening located in said sidewall and a second opening connected to an output rectangular guide, said lenses and reflectors being so arranged as to focus the energy radiated by said slot toward said first openings.

A preferred embodiment of the invention comprises two reflectors and two lenses symmetrically arranged with respect to a plane passing through the axis of said circular guide; said lenses have an inner circular cylindrical surface coaxial with said guide, with an angular aperture substantially equal to 180 degrees, and an outer circular cylindrical surface non-coaxial with said guide and having a radius smaller than that of said inner surface; radiation from said slot is directed toward two points in said sidewall; a bifurcated rectangular guide has two of its openings located in the vicinity of one and of the other of said points and a third opening connected to an output rectangular cross-section wave guide.

As it will be hereinafter explained, the calculation of the curvature radii of the surfaces of said cylindrical lenses is based on the well-known optical theory of Weierstrass' spherical lens, which has aplanetic properties with respect to a given plane object.

It will also be shown hereinafter that, if electromagentic energy is to be efficiently transferred from a channel with a given middle frequency in the main circular wave guide to an output rectangular wave guide corresponding to said channel, a determined relationship must be fulfilled between that frequency, the dielectric permittivity of the material constituting the lenses and the distance between the plane end walls of the reflecting box.

The invention will now be described in greater detail with the aid of a particular example of its embodiment and with reference to the annexed drawings, of which:

FIG. 3 is a cross-section of the coupling device of the invention by a plane perpendicular to the axis of the main cylindrical wave guide;

It will first be recalled that an optical device is said to be stigmatic with respect to two given points, when all rays issued from one of these points converge to the other point after their passing through said optical device. Further, a stigmatic optical device is aplanetic if the image of a plane object perpendicular to the axis of the optical device lies in a plane perpendicular to this same axis. The intersection points of the axis of the optical device and of the two planes are called "aplanetic points."

Figure 1:
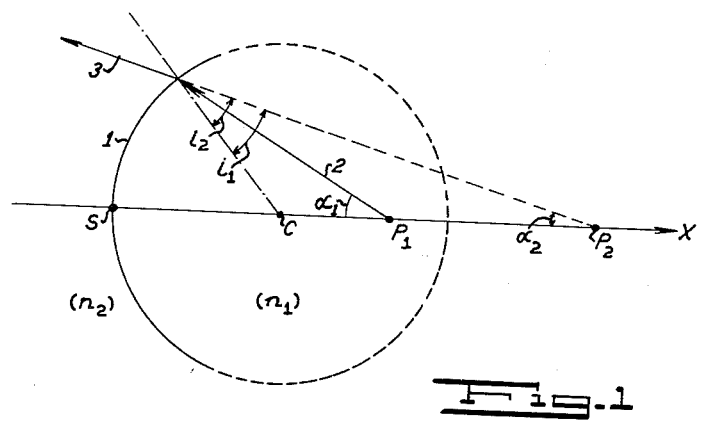
FIG. 1 is a diagram showing what in geometrical optics are called the stigmatic and aplanetic points of a spherical system.

FIG. 1 shows the positions of the two points for which a spherical dioptric system 1 is stigmatic; by "dioptric system" is to be understood a curved surface separating two media of different refractive indices. Dioptric system 1 with center C and apex S separates two media of refractive indices respectively equal to $n_1$ and $n_2$. A light ray issued from a point $P_1$ located on axis SX in the medium of index $n_1$ is refracted into medium of index $n_2$ along direction 3 which cuts axis SX at point $P_2$. It is well-known that the distances $CP_1$ and $CP_2$ to center C of the two points $P_1$ and $P_2$ for which the system is stigmatic are given by:

$$CP_1 = n_2 R / n_1 \qquad (1)$$

$$CP_2 = n_1 R / n_2 \qquad (2)$$

R being the radius of the system, and that it results therefrom that:

$$i_1 = \alpha_2 \text{ and } i_2 = \alpha_1$$

$i_1$ and $i_2$ being the incidence and refracting angles and $\alpha_1$ and $\alpha_2$ the angles of the incident and refracted rays with the axis.

From Equations 1 and 2, the following formula may be derived:

$$CP_2 / CP_1 = (n_1/n_2) \qquad (3)$$

which, taking in account that $$n_1/n_2 = \sin i_2 / \sin i_1 = \sin \alpha_1 / \sin \alpha_2$$

becomes $$CP_2 / CP_1 = n_1 \sin \alpha_1 / n_2 \sin \alpha_2 \qquad (4)$$

This is so-called "Abbe's sine condition" for the aplanetism of a centered optical system.

Figure 2:
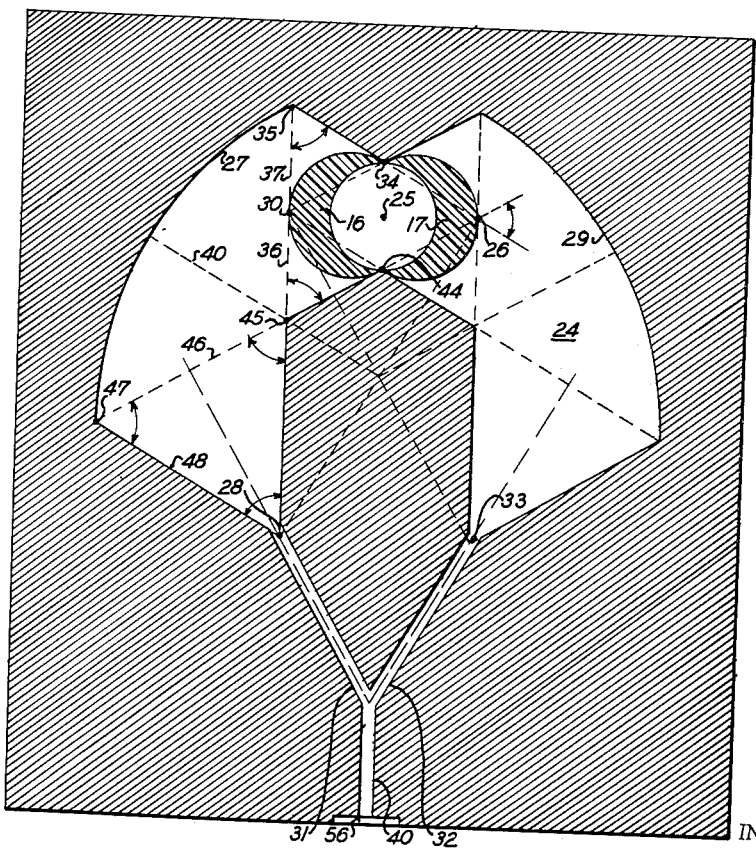
FIG. 2 represents a spherical lens, strictly stigmatic and aplanetic for a plane object.
Figure 2:
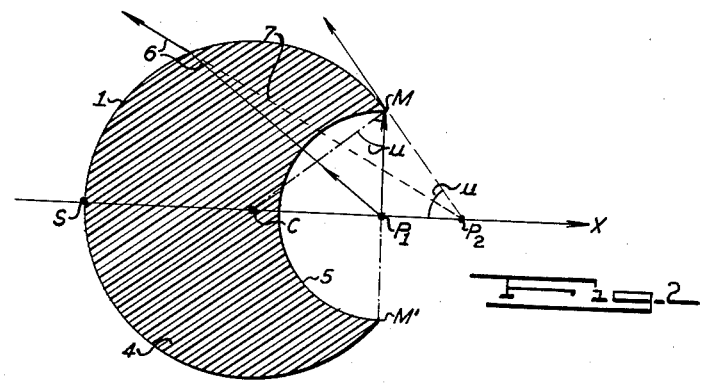

FIG. 2 shows a strictly stigmatic and aplanetic spherical lens 4. It is bounded by a convex spherical dioptric system 1 and by a concave spherical dioptric system 5. If $P_1$ and $P_2$ are the aplanetic points of dioptric system 1, dioptric system 5 is built by drawing through $P_1$ a line perpendicular to axis SX, which intersects system 1 at points M and M' and by drawing a sphere of radius $P_1M$. The rays 6 issued from point $P_1$ normally pass through surface 5 and are refracted at surface 1 so that their prolongation 7 would pass through point $P_2$. The extreme ray $P_1M$ issues tangentially to surface 1; it results therefrom that the angle $u$ between lines CM and $MP_1$ must be equal to the maximum possible refracting angle of the material constituting the lens with respect to the air; i.e.

$$\sin u = n_2/n_1 \qquad (5)$$

The angle $CP_2M$ has the same value $u$. The angular aperture of the total refracted beam, seen from point $P_2$, is therefore equal to $2u$, while the aperture of the incident beam issuing from point $P_1$ is equal to 180 degrees. If $n_2$ is the refractive index of the dielectric material constituting the lens, the limit angle $u$ is given by the relationship:

$$R_2 = R_1 \cos u \qquad (6)$$

where $R_1$ and $R_2$ are the respective radii of dioptric systems 1 and 5; Equation 5 combined with 6 leads to the formula:

$$R_2 = R_1 [1 - (n_2/n_1)^2]^{1/2} \qquad (7)$$

which gives the value of the ratio $R_2/R_1$.

Finally it must be pointed out that, if a cylindrical lens is substituted for a spherical lens, the above-mentioned stigmatic and aplanetic properties are retained provided points $P_1$ and $P_2$ be replaced by straight lines parallel to the generatrices of the cylindrical surface and passing through these points.

Figure 4A:
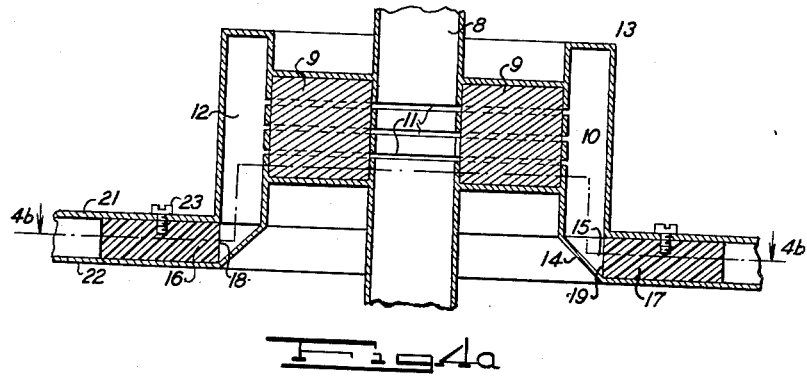
FIGS. 4a and 4b show in detail the main cylindrical wave guide, a ring-shaped resonant cavity of a first type, and the dielectric lenses included in said coupling device.
Figure 4B:
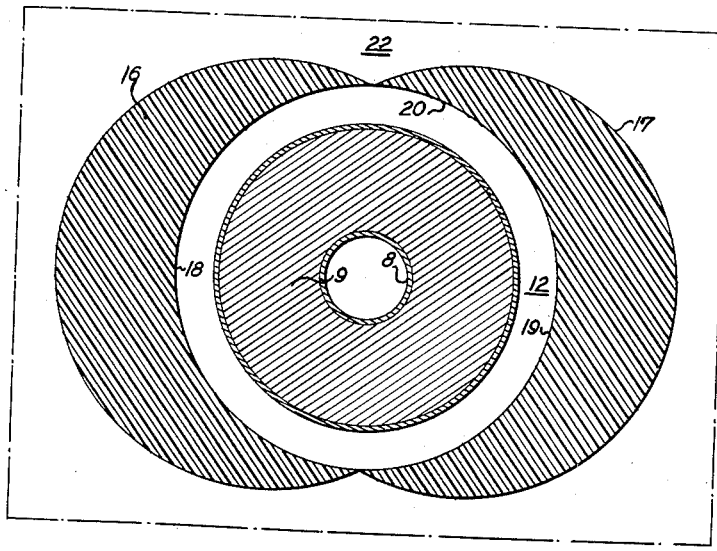

FIGS. 4a and 4b respectively show in longitudinal and transversal sections a dielectric lens system adapted to the transforming of an electromagnetic energy beam radiated by a circular slot provided in the lateral surface of a circular cylindrical resonant cavity, and thus having an angular aperture of 360 degrees, into two identical beams with an aperture $2u$ smaller than 180 degrees.

In FIGS. 4a and 4b the reference number 8 indicates the main circular wave guide in which a wide band electromagnetic wave propagates according to the $TE_{01}$ mode. A ring-shaped resonant cavity 9 is arranged around guide 8, to which it is coupled by a slot system 10. The resonant cavity 9 is itself coupled by slots 11 to a length of ring-shaped wave guide 12, closed at one of its ends 13 by a plane metallic wall perpendicular to its axis and provided at its other end 14 with a right angle elbow terminating into a peripheral circular slot 15. If the diametral cross-section of cavity 9 is substantially a square one and if its dimensions are such that, for the middle frequency of the channel of which the energy of guide 8 has to be extracted, it simultaneously resonates according to the $TE_{opq}$ and $TE_{oqp}$ modes, $p$ and $q$ respectively being integer numbers of phase half-wavelengths contained in its radial and longitudinal dimensions (the latter parallel to the axis of guide 8) of cavity 9, $p$ and $q$ respectively being even and odd (or conversely), it is known that the cavity operates like a directional coupler, the whole energy from guide 8 issuing through slot 15 and no energy flowing toward the short-circuiting end wall 13.

In order to keep the circular symmetry of the waves propagating in guide 8, the slots such as 10 and 11 must have a full 360-degree development. They thus cut the walls common to guide 8 and cavity 9 on one hand, and to cavity 9 and guide 12, on the other hand, into metal rings which must be mechanically supported with respect to the remainder of the structure. For this purpose cavity 9 may be filled by an insulating foam, shown in the drawing as shaded lines.

The lens system consists of two cylindrical lenses 16 and 17 symmetrically arranged with respect to a plane perpendicular to that of FIG. 4b in such a manner that the two inner surfaces 18, 19 of said lenses enclose a cylindrical space 20 having a height $a$, around the circular slot 15 (FIG. 4a). The height of both lenses 16, 17 (i.e. their dimension parallel to the axis of the guide) is also equal to $a$. They are held in place, for instance by means of insulating screws 23 secured to two plane parallel metal plates 21 and 22. The electromagnetic energy issues through slot 15, the height of which is also $a$, just opposite the lens surfaces 18 and 19. Guide 12 may be soldered to the metal plate 21.

The part of the electromagnetic energy the frequencies of which are outside the pass-band of resonant cavity 9 continues to propagate in guide 8. The part of the electromagnetic energy inside the pass-band of resonant cavity 9 flows into this resonant cavity where it oscillates with circular electric field lines centered on the axis of the cavity. This energy is transmitted to guide 12 in which it propagates toward slot 15. It is radiated outside the slot with an electric polarization direction perpendicular to the axis of guide 8 and parallel to the planes of plates 21 and 22.

It is known that the refractive index $n$ of a spatially limited dielectric medium with respect to free space, for a given wave frequency, is equal to the ratio of the free space wavelength $\lambda_0$ to the phase wavelength $\lambda_g$ in said spatially limited dielectric medium; i.e.

$$n = \lambda_0/\lambda_g \quad (8)$$

The ratio $n_2/n_1$ of the refractive index of the air to that of the dielectric material of the lens system 16—17, spatially limited by the metal plates 21 and 22, is therefore given by the expression:

$$n_2/n_1 = \lambda_{g1}/\lambda_{g2} \quad (9)$$

in which:

$\lambda_{g1}$ is the phase wavelength in the dielectric material constituting lenses 16 and 17.

$\lambda_{g2}$ is the phase wavelength in the air of a wave guided between the metal plates 21 and 22.

As already known, the latter wavelengths $\lambda_g$ are related to the free-space wavelength $\lambda_0$ and to the spacing of plates 21 and 22 by the classical relationships:

$$1/\lambda_{g1}^2 + 1/4a^2 = \epsilon/\lambda_0^2 \quad (10)$$

$$1/\lambda_{g2}^2 + 1/4a^2 = 1/\lambda_0^2 \quad (11)$$

$\epsilon$ being the permittivity of the dielectric material, expressed in electrostatic units.

By combining Expressions 9, 10, 11, the following relationship $$n_2/n_1 = [1 - \lambda_0^2/4a^2]^{1/2}/[\epsilon - \lambda_0/4a^2]^{1/2} \quad (12)$$

By way of example, if lenses 16 and 17 are supposed to be made of polyethylene, the value of $\epsilon$ is approximately 2.6.

If, on the other hand, as usual, $a$ is so chosen that $$\lambda_0/2a = 1/\sqrt{2} \quad (13)$$

the ratio $n_2/n_1$, given by 12 is equal to 1/2.05. The value of the limit angle $u$ as given by 5 is thus substantially equal to 30 degrees.

Equation 7 which connects the radii $R_1$ and $R_2$ of the external surfaces of each one of the lenses 16 and 17, becomes:

$$R_2/R_2 = \sqrt{3.2/4.2} \quad (14)$$

or, approximately, $$R\sqrt{3/2}$$

In conclusion: for a spacing between the metal plates 21 and 22, corresponding to $$a = \lambda_0/2\sqrt{2} \quad (13')$$

the lens system of FIGS 4a and 4b, if built of polyethylene, divides a radiating energy beam having a 360-degree aperture into two identical beams with an aperture substantially equal to 60 degrees, propagating in opposite directions.

FIG. 3 is a cross-section of the reflecting box 24 in which the beams issuing from lenses 16 and 17 of the lens device of FIGS 4a and 4b are focused, in order to direct their electromagnetic energy into the rectangular wave guides 31 and 32 which combine together into one output guide 40, corresponding to a communication channel occupying a given frequency band.

As shown in FIG. 3, the wave radiated by the spherical circular slot 15 may be considered as being constituted by rays issued from the center 25 of the space 20 enclosed by lenses 16 and 17; part of these rays are deflected through lens 16 by such an angle that their prolongations would pass through point 26, which is the second aplanetic point of the lens and is the image of center 25 seen through this lens. These rays are then reflected by reflector 27 which is assumed to be a 60° sector of an elliptical cylindrical surface and directs the reflected rays toward its second focal line, projecting at 28 and located in the plane of the input opening of the rectangular cross-section guide 31. Likewise, the beams issuing from lens 17 are directed by the cylindro-elliptical reflector 29, one focal line of which projects at point 30, toward the input opening of the rectangular cross-section guide 32 in the plane of which its second focal line 33 is located. The guide lengths 31 and 32 constitute the two branches of a Y-junction, the third branch of which is connected with a rectangular guide system adapted to the channel the energy of which is to be extracted.

One of the difficulties encountered in the building of the reflecting box arises from the fact that the extreme ray 34—35—36, issuing from lens 16 must not fall again either on this lens after having been reflected at 35 by the elliptical reflector 27 or on the remainder of the wall of the reflecting box along which the other extreme ray 44—45—46—47—48 propagates.

To properly fulfil these conditions, the shape and dimensioning of the wall may be determined in such a way that the extreme ray 34—35—36 be reflected in a parallel direction to the symmetry plane of the assembly and tangentially to the cylindrical lens 16. The calculation is particularly simple with polyethylene lenses and a cylindrical system the height $a$ of which is chosen equal to $\lambda_0/2\sqrt{2}$.

In the latter case, as the aperture of the beam issuing from lens 16 is 60 degrees, the circle representing in FIG. 3 the outer face of lens 16 is inscribed inside the equilateral triangle 26—35—45, the length of each side of which is twice the inner diameter of the cylindrical space enclosed between lenses 16 and 17, i.e. $4R_2$.

Owing to the conditions imposed on the path of radiated ray 34—35—36—28, the second focus 28 of the elliptic cross-section of reflector 27 coincides with one of the apices of the equilateral triangle 28—45—47, two sides of which are respectively colinear with two sides of the equilateral triangle 26—35—45; the latter equilateral triangles are, of course, equal ones.

The geometric dimensions of the ellipse which is the cross-section of each reflector are defined by the following conditions:

(1) The ellipse must pass through two points 34 and 45 symmetrical with respect to its shorter axis 40 and the distances 26—35 and 28—47 of which to its longer axis are equal to $4R_2$.

(2) The distance between the two foci 26—28 of the ellipse must be equal to $8R_2 \cos 30°$, i.e. $4R_2\sqrt{3}$.

It results therefrom that the half-length A of the longer axis of the ellipse is $6R_1$, and the half-length B of the shorter axis $2R_2\sqrt{6}$.

It has been experimentally found that in practice it is easily feasible to replace the ellipse 27 by its osculating circle at the end of the shorter axis 40, the radius $r$ of which is equal to $3R_2\sqrt{6}$, or else by a circle passing through points 35 and 47 and the end of the shorter axis 40.

The building of the device of the invention is thus made much easier as a circular cylindrical surface is substituted for the cylindro-elliptical one.

The formula which gives $a$ shows that, the higher is the frequency of the wave propagating in the guide, the smaller must be the spacing between the plane end walls 21, 22 of box 24. It results therefrom that in most cases no great difficulties are met in the mechanical building of this box.

Figure 5A:
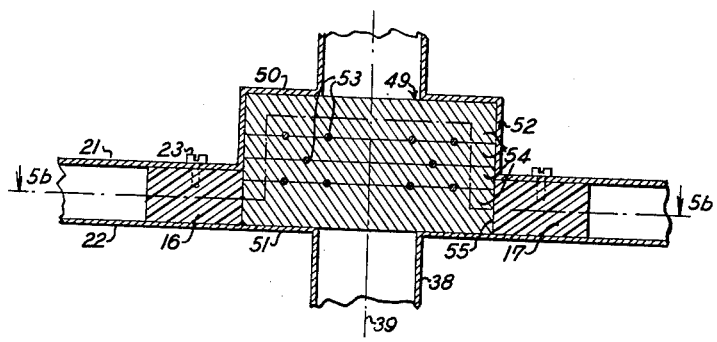
FIGS. 5a and 5b show in detail the main cylindrical wave guide, a ring-shaped resonant cavity of a second type, and said lenses of said coupling device.
Figure 5B:
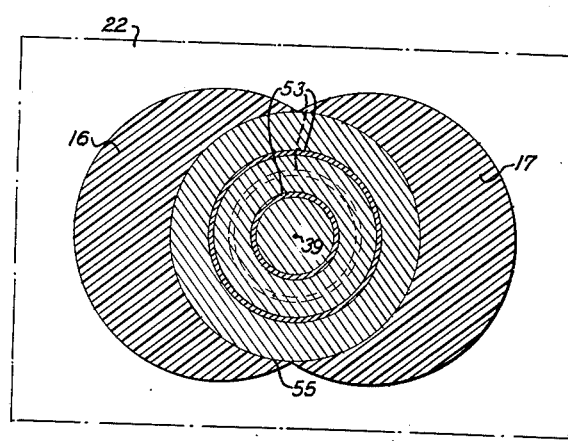

Of course, the shape of both resonant cavity 9 and its coupling arrangement with guide 8 may be chosen in a number of ways. In FIGS. 5a and 5b is thus shown a circular cylindrical cavity 49, the revolution axis 39 of which coincides with that of the main guide 38, this cavity just consisting of a widening of said guide. The resonant cavity is also limited by the plane walls 50 and 51 and by the circular cylindrical wall 52, the latter being provided with a slot 55 playing the same part as slot 15 in FIG. 4a, through which the wave energy pertaining to the considered channel is derived.

As already explained, the dimensions of cavity 49 should be such that it resonates according to both $TE_{o_n q}$ and $TE_{o q p}$ modes with $p$ and $q$ respectively even and odd (or conversely). Assuming for instance that $p=2$ and $q=3$, one of the modes comprises two half-wavelengths in the radius of the cavity and three half-wavelengths in its height, while for the other mode, the reverse relationship exists. To make these modes more easily excitable, it is advisable to set up inside the cavity a series of circular metal rings 53 along the circles along which the zero electric field surfaces for each one of the two modes intersect each other. These rings are held in place inside the cavity by means of insulating foam spacers, for instance.

The energy the frequencies of which are comprised in the pass-band of the resonant cavity 49 issues through slot 55 which is arranged in the same way as slot 15 with respect to lenses 16 and 17 in FIG. 4a. The energy the frequencies of which are outside the pass-band of cavity 49 propagates further on in the main circular guide 38.

Figure 6:
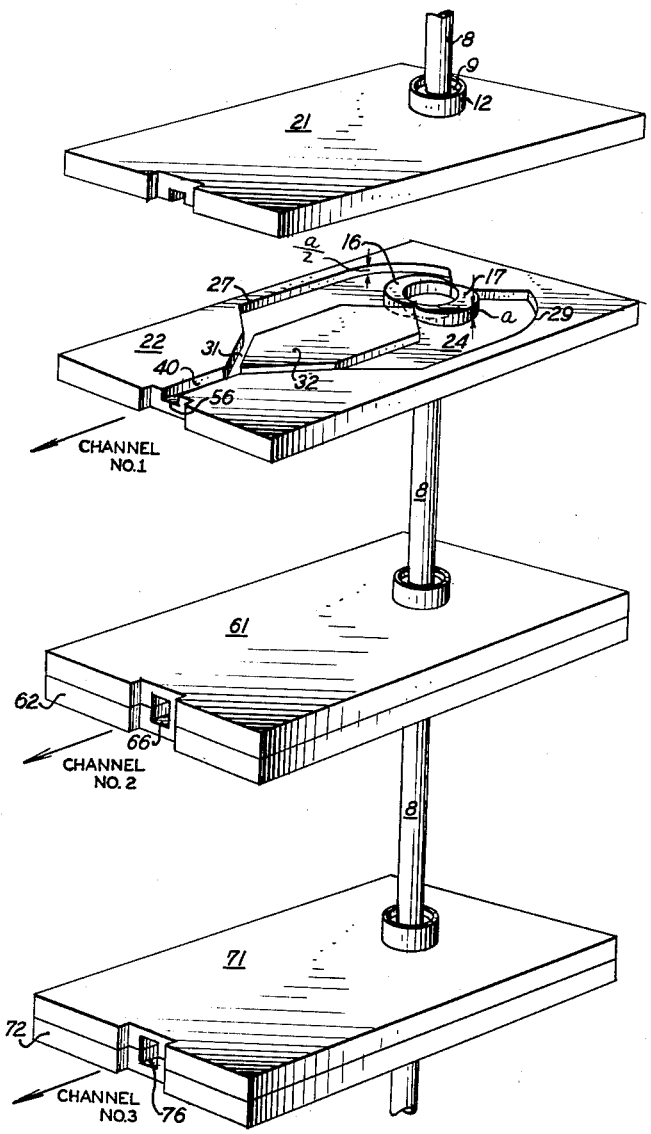
FIG. 6 shows in perspective a branching or multichannel filter constituted by the assembly of one main circular guide and several coupling devices according to the invention, one of the latter being shown open in order to show its inside.

FIG. 6 shows a multichannel filter consisting of a main circular wave guide in which a wide-band wave propagates according to the $TE_{01}$ mode and by three coupling devices of the type of FIG. 3, the resonant cavities of which are respectively tuned to the middle frequencies of three different frequency channels. In this figure, the parts already shown in FIGS. 1–5 are designated by the same reference numbers as in the latter. The first coupling device includes two identical half-boxes 21 and 22 made of thick copper plates in which a hollow space 24 and three rectangular cross-section guides 31, 32 and 40 have been machined to the depth $a/2$, while holes are provided for the passing through of the main guide 8, as well as for the cavity 9 and the spacing 12 between the latter and the lenses. Before assembling the two half-boxes, lenses 16 and 17 are secured to one of them.

The second and third coupling devices are shown with their respective half-boxes 61—62 and 71—72 assembled in pairs. At the output 56 of the rectangular wave guide 40 in the first coupling device, the energy of a first channel is collected; similarly at the output 66 of a corresponding rectangular guide in the second coupling device, the energy of a second channel is collected, while that of a third channel is received at the output 76 of a rectangular guide included in the third coupling device.

It has been assumed in the above-given description that the flat omnidirectional beam radiated by slots 15 (FIG. 4a) or 55 (FIG. 5a) was collected by two lenses, each one taking care of one-half of the aperture angle of said beam. Within the scope of the invention, it is also possible to build coupling systems comprising more than two cylindro-elliptical reflectors and two lenses. For instance a three fold system, including three identical groups of elements regularly distributed all around the main guide, at 120-degree angular intervals, can easily be designed. In such a system, connection of three rectangular guide openings, located at 120-degree spacings in the inner sidewall of the reflecting box, to a common output guide is required. Although it is by no ways impossible to build a suitable connecting member for such a purpose, it must be said that its construction would necessarily be more complicated and expensive than that of the above-described embodiment of the invention, and that the latter should actually be preferred in most practical cases.

What is claimed is:

1. A coupling device for transferring ultra-high frequency electromagnetic energy from a circular cross-section wave guide in which it propagates according to a circular electric mode to a rectangular cross-section output wave guide, comprising, in combination, a ring-shaped circular cylindrical resonant cavity coupled to said circular guide and substantially coaxial therewith, a peripheral circular slot in the outer cylindrical wall of said cavity, a reflecting box enclosing said cavity and limited on one hand by two plane conducting end walls substantially perpendicular to the axis of said circular guide and by a conducting sidewall substantially parallel to said axis, a plurality of cylindrical dielectric material lenses set up inside said box and having their cylindrical surfaces substantially parallel to said axis, a plurality of cylindrical reflectors set up inside said box and having their surfaces substantially parallel to said axis, and a plurality of auxiliary rectangular cross-section wave guide lengths each having a first opening located in said sidewall and a second opening connected to said output guide, said lenses and reflectors being so arranged as to focus the energy radiated by said slot toward said first openings.

2. A coupling device as claimed in claim 1, wherein said reflectors consist of parts of said conducting sidewall.

3. A coupling device as claimed in claim 1, wherein the cross-section of said cylindrical reflectors perpendicular to the generatrices of their surface is substantially a sectoral part of an ellipse.

4. A coupling device as claimed in claim 1, wherein the cross-section of said cylindrical reflectors perpendicular to the generatrices of their surface is substantially a sectoral part of a circle.

5. A coupling device as claimed in claim 1, wherein the cross-sections of the inner and outer cylindrical surfaces of said lenses perpendicular to their generatrices are sectoral parts of circles, and wherein the circular cross-section of said inner surface is centered on said axis of said circular guide.

6. A coupling device as claimed in claim 1, comprising two lenses and two reflectors symmetrically arranged with respect to a diametral symmetry plane passing through the axis of said circular guide.

References Cited in the file of this patent

UNITED STATES PATENTS 2,952,820    Lewin  ---------------- Sept. 13, 1960
2,963,663    Marcatili  -------------- Dec. 6, 1960